Nov. 25, 1941.  G. M. GRAHAM  2,263,801

TESTER FOR HYDRAULIC VALVE LIFTERS

Filed July 3, 1940

INVENTOR.
George M. Graham
BY
Parker & Burton
ATTORNEYS.

Patented Nov. 25, 1941

2,263,801

UNITED STATES PATENT OFFICE 2,263,801

TESTER FOR HYDRAULIC VALVE LIFTERS

George M. Graham, Detroit, Mich., assignor to Hinckley-Myers Company, Jackson, Mich., a corporation of Michigan Application July 3, 1940, Serial No. 343,906

8 Claims. (Cl. 73—51)

This invention relates to an improved tool or testing device for testing hydraulic valve lifters.

An object is to provide a testing device of simple, rugged, inexpensive construction which is adapted to test a hydraulic valve lifter device against a master valve lifter to determine the features of the lifter being tested for service.

The tool is so constructed that each lifter tested is tested against a master device of known capability and the testing tool indicates whether the device being tested measures up to the required standard of the master device.

The master unit is identified by the manufacturers' calibration rate which may be etched on the side of the cylinder and which denotes the let down time. One of these master units is used in the tool during each test. It is disposed in the indicated socket. The unit to be tested is first thoroughly cleaned. It is then placed in the proper socket of the testing tool and the two devices, the master and the device being tested, are filled with liquid by pumping action through operation of the handle. Thereafter the handle is depressed to subject the two devices to pressure simultaneously and the resistance of the two devices is measured in such a way as to indicate whether the device being tested measures up to the required standard set by the master device.

An object is to provide a testing tool so constructed as to receive a master device and a device to be tested thereagainst and so constructed as to fill said devices with hydraulic fluid and further so constructed as to compare the resistance of the device being tested to pressure tending to eject said fluid with the known resistance of the master device to the same pressure.

Figure 1:
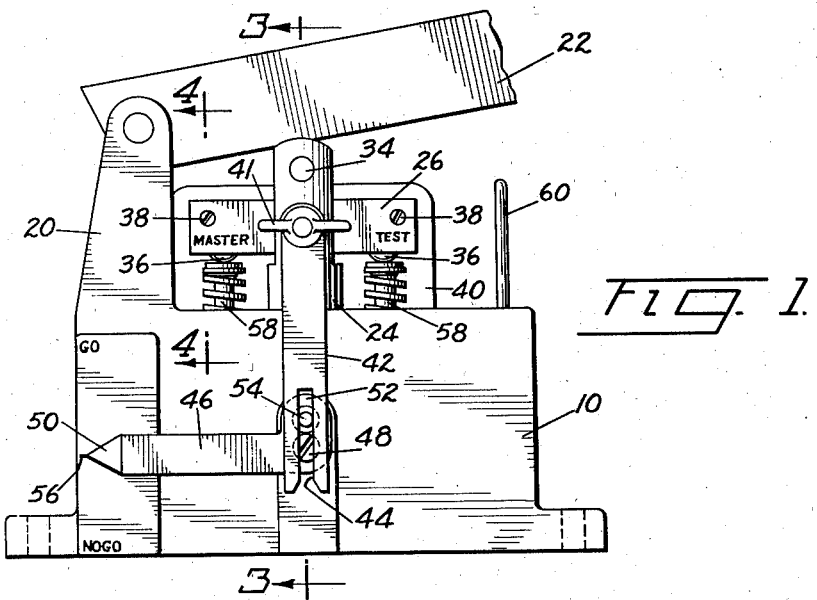
Figure 2:
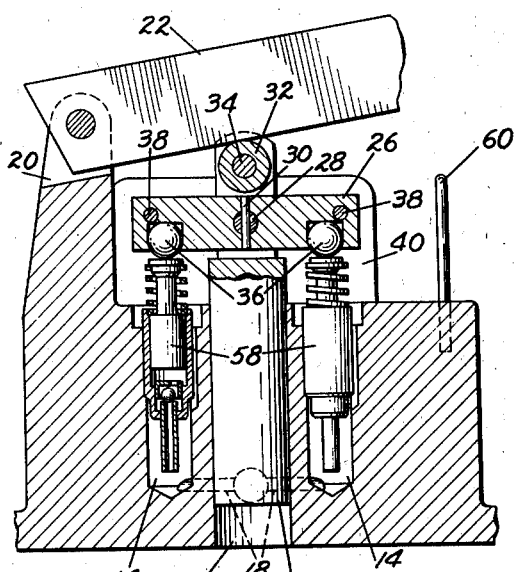
Figure 3:
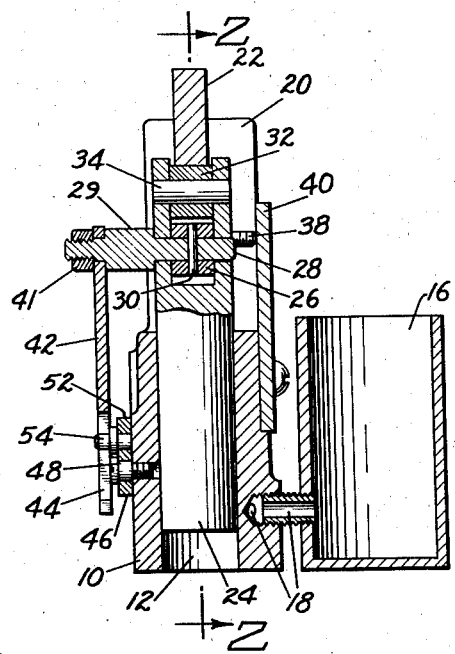
Figure 4:
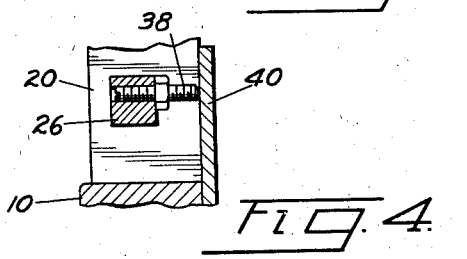

The above objects and others, together with various meritorius features, will more fully appear from the following specification, appended claims, and accompanying drawing, wherein:

Figure 1 is a side elevation of a machine embodying my invention in use,

Fig. 2 is a vertical sectional view taken through the structure of Fig. 1 taken on line 2—2 of Fig. 3, Fig. 3 is a vertical sectional view taken on line 3—3 of Fig. 1, and Fig. 4 is a vertical sectional view taken on line 4—4 of Fig. 1.

Numeral 10 indicates a foundation or base which may be bolted at the ends to a work bench and which is cored out at 12 to provide a cylindrical recess within which a plunger operates and is cored out on opposite sides of said plunger at 14 to provide sockets adapted to receive valve lifter devices. A reservoir 16 communicates through a Y-shaped passageway 18 with each of the sockets to deliver hydraulic fluid thereto. The sockets are shaped by being cut out to different diameters to receive and seat a hydraulic valve lifter as shown in Fig. 2.

The base 10 is provided with an upwardly projecting support 20 within which is pivoted a handle 22 to be manually actuated as hereinafter described.

There is a plunger 24 disposed within the recess 12. This plunger carries a cross beam 26 which extends therethrough as shown in Figs. 2 and 3. The plunger is forked at its upper end to permit of this disposition. A shaft 28 is journalled within the fork of the plunger and the cross beam 26 is pinned to this shaft by pin 30 for pivotal swinging movement. Between the forks of the plunger above the cross beam is mounted a beam pilot bearing roller 32. This roller is supported upon a spindle 34. It is adapted to take the thrust of the handle 22 as shown in the drawing.

The cross beam is provided at each end on its lower surface with a bearing ball 36 adapted to bear against the upper end of a valve lifter disposed within a socket 14. The cross beam is also provided with adjusting screws 38 which bear against a plate 40 secured to one side of the base 10 to prevent wobbling of the cross beam.

The shaft 28 upon which the cross beam is supported projects beyond the plunger as at 29 and a link 42 is adjustably secured thereto by a wing nut 41. The link 42 is slotted as at 44 at its lower end. A pointer 46 is pivoted at 48 to the base. This pointer has a long pointer arm which terminates in an end 50. It has a short pointer arm 52 which carries a pin 54 which pin is received within slot 44 of the link 42 as shown in Figs. 1 and 3.

There is an indicating surface on the base which, while not here shown as graduated, might be graduated. As here shown its upper end carries the word "Go" and the lower end carries the words "No go." Intermediate these words is a zero line 56. The end 50 of the pointer 46 is adapted to travel over this surface. The cross beam is marked at one end with the word "Master" and at the other end with the word "Test" as shown in Fig. 1.

In testing a hydraulic valve lifter there is provided a master lifter whose capacity is known. This master lifter is inserted in the socket underneath the master indicated end of the cross beam. One of these lifters is indicated at 58 in Fig. 2. The construction of the lifter is something with which we are not here concerned but the master lifter is similar to that of the lifter being tested and the lifter being tested is indicated by the same numeral 58.

In the testing of the lifters the master is placed within the master socket and the device to be tested within the test socket. The handle 22 is operated up and down to bring pressure to bear on the upper ends of the two valve lifter devices. This pumping pressure fills the valve lifters with hydraulic fluid from reservoir 16. After the valve lifters are filled with fluid it will be observed that they are hard to depress.

After the lifters are filled the handle is rested on the beam pilot bearing roller 32 and the pointer is adjusted to the zero position on the scale (adjustment nut 41 provides for this) as shown in Fig. 1. The handle is now pressed down with sufficient force to compress the valve lift devices. If the device being tested has a leakage greater than the permitted minimum the end of the beam 26 above the device being tested will swing downwardly and the pointer will swing toward the "no go" end of the scale. If the device being tested is up to standard in that its permitted leakage equals the master the cross beam will not swing angularly but will remain on an even keel. If the device being tested has less leakage than the master the end of the pointer will swing in the opposite direction. So long as the end of the pointer does not swing toward the "no go" end of the scale the device being tested is satisfactory for use.

There is a cleaning pin 60 provided on the base upon which may be inserted the tubular portions of the lifters to clean them out. The lifters should be cleaned and thoroughly washed before testing. It is advisable to mount the base in a liquid container on a bench so that any fluid being exhausted will be caught in the container. The base should be secured to the bench for use.

What I claim is:

1. A valve lifter hydraulic testing tool comprising a base having a pair of valve lifter sockets, a liquid container reservoir communicating with each of said sockets to deliver liquid thereto, a pilot plunger supported for reciprocation and provided with a pivoted cross beam having bearing portions overhanging said lifter sockets, means for actuating said pilot plunger, and indicator mechanism coupled with said cross beam to indicate angular movement of the beam.

2. A valve lifter hydraulic testing tool comprising a liquid containing reservoir, means having a pair of spaced apart sockets each communicating with said reservoir to receive liquid therefrom and each adapted to receive a valve lifter, a pilot plunger supported between said valve lifter sockets for reciprocation, a cross beam pivotally supported upon said plunger with its opposite ends overhanging said valve lifter sockets, and indicator mechanism coupled with the cross beam and having a pointer positioned to indicate upon a scale direction of angular movement of the beam.

3. A valve lifter hydraulic testing tool comprising means provided with a pair of valve lifter sockets, a liquid containing reservoir communicating with each of said sockets to deliver liquid thereto, a pilot plunger supported for reciprocation, a cross beam extending transversely through the plunger and fixed to a pivot shaft journalled in the plunger, said cross beam provided with a pair of bearing portions disposed on opposite sides of its pivotal support and overhanging said valve lifter sockets, and indicator mechanism coupled with the cross beam shaft and adapted to indicate angular movement thereof.

4. A valve lifter hydraulic testing tool comprising means provided with a pair of valve lifter sockets, a liquid containing reservoir communicating with each of said sockets to deliver liquid thereto, a pilot plunger supported for reciprocation and provided with a cross beam extending transversely therethrough and fixed to a shaft journalled therein, said cross beam provided with a pair of bearing portions disposed on opposite sides of its pivotal support and overhanging said valve lifter sockets, a slotted arm fixed to said shaft, and a pivotally supoprted pointer coupled through the slot with said arm to be actuated thereby upon angular movement of the cross beam.

5. A valve lifter hydraulic tester tool comprising a base having a pair of valve lifter sockets, a liquid containing reservoir communicating with each of said sockets to deliver liquid thereto, a cross beam having opposed ends overhanging said sockets, means supporting said cross beam for reciprocation axially of said sockets and for pivotal tilting movement toward and away from each socket, means for exerting pressure on said cross beam toward said sockets while permitting pivotal tilting movement thereof, and indicator mechanism coupled with said cross beam to indicate pivotal tilting movement thereof.

6. A valve lifter hydraulic testing tool comprising a base having a pair of valve lifter sockets, a liquid containing reservoir communicating with each of said sockets to deliver liquid thereto, means supported to bring pressure to bear simultaneously on devices disposed within said sockets and indicator mechanism coupled with said means to indicate a difference in the resistance of said two devices to the pressure exerted by said means thereupon.

7. A valve lifter hydraulic testing tool comprising a base having a pair of valve lifter sockets, a liquid containing reservoir communicating with said sockets to deliver liquid thereto, a plunger supported for reciprocation axially of the sockets, a cross beam carried by the plunger for reciprocation therewith toward and away from the sockets and having its opposite ends overhanging the sockets and pivotally supported by the plunger for tilting movement toward and away from each socket, means operable to exert pressure on the plunger axially of and toward the sockets, and indicator mechanism coupled with the cross beam to indicate tilting movement of the cross beam.

8. A valve lifter hydraulic testing tool comprising a base having a pair of valve lifter sockets, a liquid containing reservoir communicating with said sockets to deliver liquid thereto, said base having a plunger socket positioned between the valve lifter sockets, a plunger reciprocable within the plunger socket, a cross beam pivoted to the plunger to reciprocate therewith and to tilt relative thereto and having its opposite ends overhanging the valve lifter sockets, a handle pivotally supported upon the base adapted to urge the plunger toward the sockets, a link angularly adjustably connected with the cross beam and a pointer coupled with the link to swing in response to tilting of the cross beam.

GEORGE M. GRAHAM.